US010330542B1

(12) United States Patent
Pearce (10) Patent No.: US 10,330,542 B1
(45) Date of Patent: Jun. 25, 2019

(54) TORQUE SENSOR ASSEMBLY FOR VEHICLE POWER STEERING SYSTEMS

(71) Applicant: TRW Automotive U.S. LLC, Livonia, MI (US)

(72) Inventor: Robert Pearce, Royal Oak, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/492,038

(22) Filed: Apr. 20, 2017

(51) Int. Cl.
*G01L 3/00* (2006.01)
*G01L 3/10* (2006.01)
*G01L 5/22* (2006.01)

(52) U.S. Cl.
CPC .............. *G01L 3/103* (2013.01); *G01L 5/221* (2013.01)

(58) Field of Classification Search
CPC ................................ G01L 3/103; G01L 5/221
USPC ....................................................... 73/862.336
See application file for complete search history.

(56) References Cited

U.S. PATENT DOCUMENTS

| 4,127,802 | A | * | 11/1978 | Johnson | ................. | H02K 37/18 |
| | | | | | | 310/114 |
| 7,028,545 | B2 | | 4/2006 | Gandel et al. | | |
| 7,784,365 | B2 | * | 8/2010 | Masson | ................... | G01L 3/104 |
| | | | | | | 73/862.331 |
| 2002/0189371 | A1 | * | 12/2002 | Nakane | .................... | B62D 6/10 |
| | | | | | | 73/862.333 |
| 2004/0098219 | A1 | * | 5/2004 | Tokumoto | ................ | B62D 6/10 |
| | | | | | | 702/151 |
| 2005/0194790 | A1 | * | 9/2005 | Kurachi | ................. | H02K 7/183 |
| | | | | | | 290/44 |
| 2007/0180905 | A1 | | 8/2007 | Kaoku et al. | | |
| 2008/0028870 | A1 | * | 2/2008 | Tokumoto | ............... | G01L 5/221 |
| | | | | | | 73/862.333 |
| 2008/0210047 | A1 | * | 9/2008 | Hallet | ...................... | G05G 1/08 |
| | | | | | | 74/507 |

(Continued)

FOREIGN PATENT DOCUMENTS

| JP | 2011017647 A | 1/2011 |
| JP | 2011242189 A | 12/2011 |
| KR | 100976701 B1 | 8/2010 |

OTHER PUBLICATIONS

PCT Search Report and the Written Opinion, Application No. PCT/US2018/028477 filed Apr. 20, 2018, dated Aug. 1, 2018.

*Primary Examiner* — Max H Noori
(74) *Attorney, Agent, or Firm* — MacMillan, Sobanski & Todd, LLC (57) ABSTRACT

A torque sensor assembly for use in a vehicle power steering system has magnets, coaxial first, second, and third flux closure members around the magnets, and first and second magnetic sensors. Each of the plurality of magnets emits a magnetic field. The second flux closure member is between the first and third flux closure members. The first and third flux closure members collect the magnetic fields having a first polarity. The second flux closure member collects the magnetic fields having a second polarity that is opposite the first polarity. The first and second magnetic sensors are positioned to have like polarity. The first sensor is between the first and second flux closure members. The second sensor is between the second and third flux closure members. A torque signal is calculated by subtracting a second signal generated by the second sensor from a first signal generated by the first sensor.

19 Claims, 10 Drawing Sheets

(56) References Cited

U.S. PATENT DOCUMENTS

| | | | | |
|---|---|---|---|---|
| 2009/0027045 A1* | 1/2009 | Islam | G01D 5/145 | |
| | | | 324/207.13 | |
| 2009/0078058 A1* | 3/2009 | Aoki | G01L 5/221 | |
| | | | 73/862.335 | |
| 2010/0084215 A1* | 4/2010 | Sakatani | B62D 6/10 | |
| | | | 180/444 | |
| 2011/0227562 A1* | 9/2011 | Sasaki | G01D 5/2452 | |
| | | | 324/207.25 | |
| 2012/0073386 A1* | 3/2012 | McDonald | B62D 6/10 | |
| | | | 73/862.09 | |
| 2013/0312539 A1* | 11/2013 | Shimomura | G01L 3/101 | |
| | | | 73/862.325 | |
| 2014/0123770 A1* | 5/2014 | Lee | G01L 3/101 | |
| | | | 73/862.193 | |
| 2014/0283623 A1* | 9/2014 | Song | B62D 6/10 | |
| | | | 73/862.193 | |
| 2016/0153849 A1* | 6/2016 | Takahashi | B62D 6/10 | |
| | | | 73/862.325 | |

* cited by examiner

TORQUE SENSOR ASSEMBLY FOR VEHICLE POWER STEERING SYSTEMS

BACKGROUND OF INVENTION

This invention relates in general to vehicle power steering systems and in particular to a torque sensor assembly for use in such a vehicle power steering system.

Automotive vehicles typically include a power steering system to assist in turning steerable wheels of the vehicle. The power steering system will typically include a rack and pinion assembly to convert rotational movement of a steering wheel of the vehicle into linear movement to effect turning of the steerable wheels. A torque sensor assembly is commonly used to measure a direction and magnitude of steering torque applied to the steering wheel by a driver of the vehicle. The measured direction and magnitude of the steering torque is then used by an electronic control unit to operate a power source that assists in turning the steerable wheels.

The torque sensor assembly may operate by using a magnetic sensor to detect variations in a magnetic field generated by a magnet fixed to a steering component that rotates with the steering wheel. However, such a torque sensor assembly is susceptible to external magnetic fields that may cause an output of the torque sensor to misrepresent the steering torque applied by the driver. The external magnetic fields may be produced by a source external to the vehicle and/or from within the vehicle. For example, the external magnetic fields may result from high current electrical cables—e.g., a starter cable—being routed adjacent the torque sensor assembly due to packaging requirements for the vehicle. Furthermore, autonomous vehicles are expected to require steering systems with increasingly precise torque sensor assemblies that are not susceptible to external magnetic fields.

The torque sensor assembly may be shielded from the external magnetic fields to prevent misrepresentation of the steering torque applied by the driver. However, such shielding adds cost, weight, and complexity to the vehicle. Thus it would be desirable to have a torque sensor assembly that mitigates external magnetic fields without requiring shielding.

SUMMARY OF INVENTION

This invention relates to a torque sensor assembly for a vehicle power steering system.

According to one embodiment, a torque sensor assembly may comprise, individually and/or in combination, one or more of the following features: a plurality of magnets, coaxial first, second, and third flux closure members around the magnets, and first and second magnetic sensors. Each of the plurality of magnets emits a magnetic field. The second flux closure member is between the first and third flux closure members. The first and third flux closure members collect the magnetic fields having a first polarity and the second flux closure member collects the magnetic fields having a second polarity that is opposite the first polarity. The first and second magnetic sensors are positioned to have like polarity. The first sensor is between the first and second flux closure members and the second sensor is between the second and third flux closure members.

According to this embodiment, the torque sensor assembly further comprises a first signal output by the first sensor in response to the magnetic fields; and a second signal output by the second sensor in response to the magnetic fields.

According to this embodiment, the torque sensor assembly further comprises a torque signal calculated by subtracting the second signal from the first signal.

According to this embodiment, the first, second, and third flux closure members are ferromagnetic rings.

According to this embodiment, the torque sensor assembly further comprises first fingers extending from the first flux closure member; second fingers extending from the second flux closure member; and third fingers extending from the third flux closure member, wherein the first and third fingers align with first poles of the magnets when the second fingers align with second poles of the magnets, the first poles have the first polarity, and the second poles have the second polarity.

According to this embodiment, a first quantity of the first fingers is equal to a second quantity of the second fingers, a third quantity of the third fingers, and a fourth quantity of the magnets.

According to this embodiment, the torque sensor assembly further comprises at least one flux closure extension between the first flux closure member and the first sensor, the second flux closure member and the first and second sensors, or the third flux closure member and the second sensor.

According to this embodiment, the first and second sensors are Hall effect sensors, giant magnetoresistance sensors, anisotropic magnetoresistance sensors, or fluxgate magnetometers.

According to this embodiment, the magnets are arranged with alternating poles in a circumferential direction.

According to this embodiment, the magnets comprise a plurality of magnet layers coaxial with the first, second, and third flux closure members and the magnets in the magnet layers are arranged with alternating poles in circumferential and axial directions.

According to this embodiment, the plurality of magnet layers comprises first, second, and third magnet layers.

According to this embodiment, the torque sensor assembly further comprises a first shaft; and a second shaft, wherein the magnet is fixed to the first shaft and the first and second sensors are fixed to the second shaft.

According to another embodiment, a torque sensor assembly may comprise, individually and/or in combination, one or more of the following features: a plurality of circularly arranged magnets, a first flux closure member having first fingers, a second flux closure member having second fingers, a third flux closure member having third fingers, a first magnetic sensor, and a second magnetic sensor. Each of the magnets has a first pole and a second pole and the first and second poles alternate in a circumferential direction. The first, second, and third flux closure members are ferromagnetic rings coaxial with the plurality of magnets. The second flux closure member is between the first and third flux closure members. The first and third fingers align with the first poles and the second fingers align with the second poles. The first magnetic sensor is between the first and second flux closure members and generates a first signal in response to the plurality of magnets. The second magnetic sensor is between the second and third flux closure members and generates a second signal in response to the plurality of magnets. The second sensor is positioned to have like polarity with the first sensor and the second signal subtracted from the first signal is a torque signal for the power steering system.

According to this embodiment, the torque sensor assembly further comprises a first flux closure extension between the first flux closure member and the first sensor; a second flux closure extension between the second flux closure member and the first and second sensors; and a third flux closure extension between the third flux closure member and the second sensor, wherein the first sensor is in a first gap between the first and second flux closure extensions and the second sensor is in a second gap between the second and third flux closure extensions.

According to this embodiment, a first quantity of the first fingers is equal to a second quantity of the second fingers, a third quantity of the third fingers, and a fourth quantity of the magnets.

According to another embodiment, a torque sensor assembly may comprise, individually and/or in combination, one or more of the following features: a plurality of circularly arranged magnets, coaxial first, second, and third flux closure members around the magnets, and first and second magnetic sensors. The magnets each emit a magnetic field and are arranged in magnet layers with alternating first and second poles in axial and circumferential directions. The first, second, and third flux closure members are ferromagnetic rings. The second flux closure member is between the first and third flux closure members. The first and third flux closure members collect the magnetic fields having a first polarity and the second flux closure member collects the magnetic fields having a second polarity that is opposite the first polarity. The first sensor is between the first and second flux closure members and generates a first signal in response to the magnetic fields. The second sensor is between the second and third flux closure members and generates a second signal in response to the magnetic fields. The second sensor is positioned to have like polarity with the first sensor and the second signal subtracted from the first signal is a torque signal for the power steering system.

According to this embodiment, the plurality of magnet layers comprises first, second, and third magnet layers.

According to this embodiment, the second flux closure member has fingers collecting the magnetic fields having the second polarity.

One or more potential and/or realized advantages of an embodiment of the torque sensor assembly is reduced susceptibility of a torque sensor to external magnetic fields without the use of shielding. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
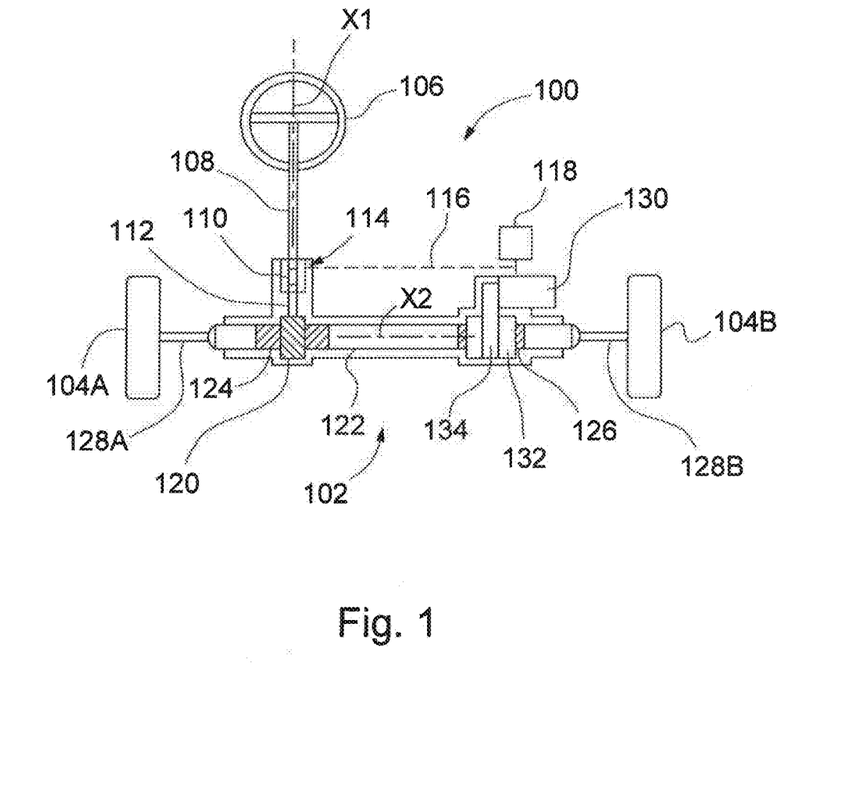
FIG. 1 is a schematic view of a vehicle power steering system having a first embodiment of a torque sensor assembly in accordance with the present invention.

Referring now to FIG. 1, there is schematically illustrated a portion of a vehicle power steering system, indicated generally at 100. The general structure and operation of the power steering system 100 is conventional in the art. For example, the power steering system 100 may be as disclosed by U.S. Pat. No. 7,055,646 to Bugosh, the disclosure of which is hereby incorporated by reference in entirety herein. Thus, only those portions of the power steering system 100 which are necessary for a full understanding of this invention will be explained and illustrated in detail. Although this invention will be described and illustrated in connection with the particular power steering system 100 disclosed herein, it will be appreciated that this invention may be used in connection with other vehicle power steering systems, including other electric, hydraulic, or otherwise powered power steering systems known to those skilled in the art.

The power steering system 100 is partially housed in a housing, indicated generally at 102. The power steering system 100 is associated with first and second front steerable wheels 104A and 104B, respectively, of a vehicle.

A vehicle steering wheel 106 is operatively coupled to an input shaft 108 for rotation therewith about a steering axis X1. In turn, the input shaft 108 is operatively connected by a torsion bar 110 to a lower shaft 112. A torque sensor assembly, indicated generally at 114, encircles the input shaft 108, torsion bar 110, and lower shaft 112. The torque sensor assembly 114 is fixed to the input shaft 108 and the lower shaft 112. As will be discussed, the torque sensor assembly 114 generates electrical signals in response to rotation of the input shaft 108. The signals are transmitted over a data network 116 to an electronic control unit (ECU) 118. The signals indicate a direction and magnitude of steering torque applied to the steering wheel 106.

The lower shaft 112 is operatively connected to a pinion 120. The torsion bar 110 twists in response to the steering torque applied to the steering wheel 106. When the torsion bar 110 twists, relative rotation occurs between the input shaft 108 and the pinion 120, via the lower shaft 112.

A linearly moveable steering member 122 is moveable along a rack axis X2. A rack portion 124 of the steering member 122 is provided with a series of rack teeth which meshingly engage gear teeth provided on the pinion 120. The steering member 122 further includes a screw portion 126 having an external screw thread convolution. The steering member 122 is connected to the first steerable wheel 104A by a first tie rod 128A and the second steerable wheel 104B by a second tie rod 128B. The first and second tie rods 128A and 128B, respectively, are located at distal ends of the steering member 122. Linear movement of the steering member 122 along the rack axis X2 results in steering movement of the first and second steerable wheels 104A and 104B, respectively, in a known manner.

The power steering system 100 further includes a power source 130 drivably connected to a ball nut assembly 132. The power source 130 is illustrated as an electric motor, but may be other than an electric motor. For example, the power source 130 may be a hydraulic system. The ECU 118 controls the power source 130 in accordance with the signals received from the torque sensor assembly 114. Control signals are transmitted from the ECU 118 to the power source 130 via the data network 116.

The ball nut assembly 132 is operatively connected with the screw portion 126 of the steering member 122. The power source 130 and ball nut assembly 132 are operatively connected by a pulley assembly 134 that includes a belt between an output of the power source 130 and the ball nut assembly 132.

Rotation of the pulley assembly 134 causes the ball nut assembly 132 to be rotated and thereby produce linear movement of the steering member 122. The power source 130 rotates the pulley assembly 134 which in turn transmits the drive force of the power source 130 to a ball nut of the ball nut assembly 132. Because the ball nut is fixed in position on the rack axis X2, the steering member 122 is driven to move linearly in response to rotation of the ball nut to, as discussed, effect steering movement of the first and second steerable wheels 104A and 104B, respectively, of the vehicle. The power source 130 thus provides steering assist in response to the applied steering torque.

In the event of the inability of the power source 130 to effect linear movement of the steering member 122, the mechanical connection between the gear teeth on the pinion 120 and the rack teeth on the rack portion 124 permits manual steering of the vehicle.

Figure 2:
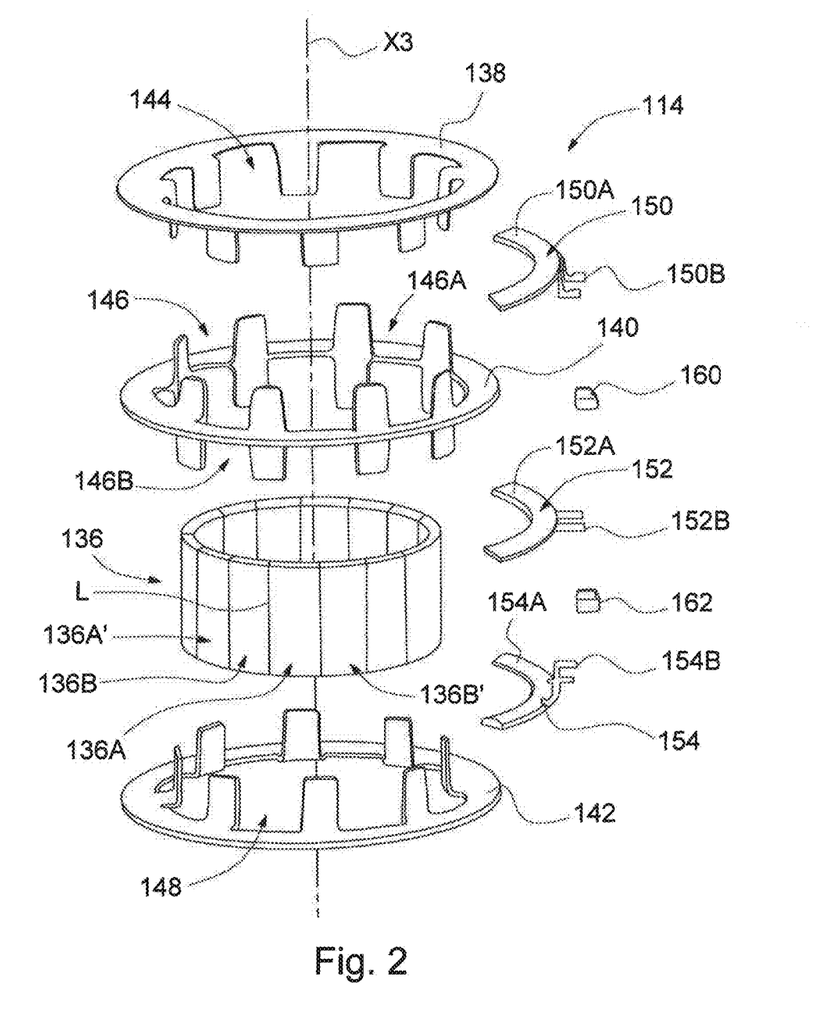
FIG. 2 is an exploded perspective view of the torque sensor assembly of FIG. 1.
Figure 3:
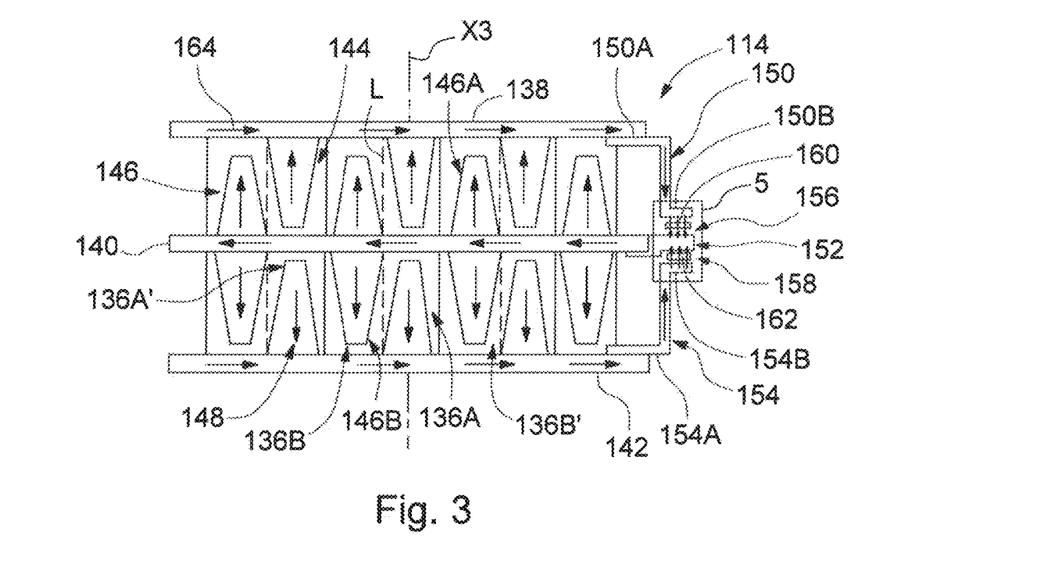
FIG. 3 is an elevation view of the torque sensor assembly of FIG. 1 in a first position.
Figure 4:
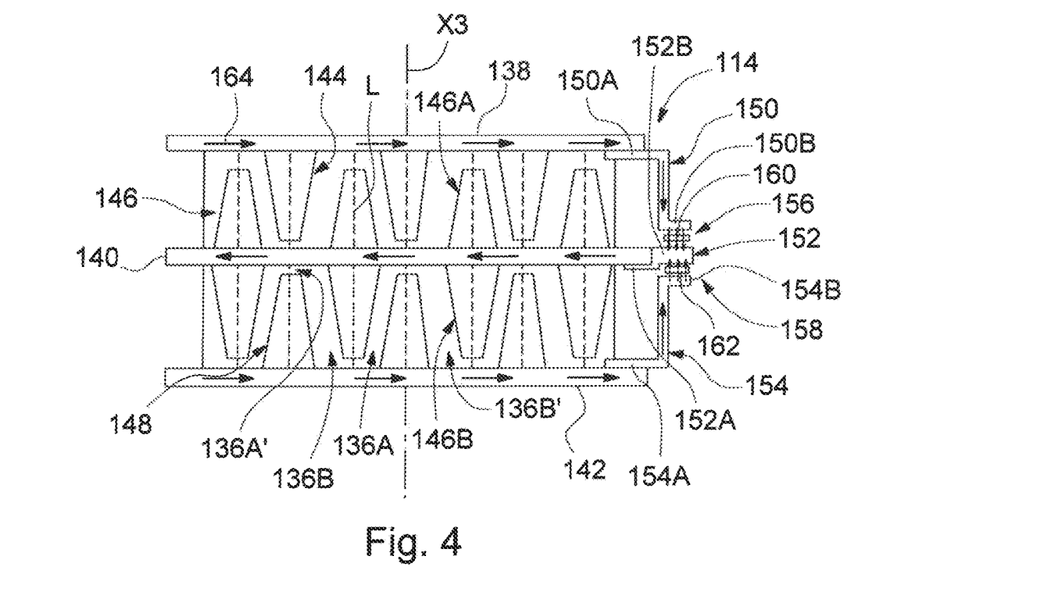
FIG. 4 is an elevation view of the torque sensor assembly of FIG. 1 in a second position.

Referring now to FIGS. 2-4, there is illustrated the torque sensor assembly 114 in detail. The torque sensor assembly 114 has a plurality of magnets, indicated generally at 136, circularly arranged around a torque assembly axis X3. Also on the torque assembly axis X3 are first, second, and third flux closure members, 138, 140, and 142, respectively. When assembled, the first, second, and third flux closure members 138, 140, and 142, respectively, are substantially parallel oriented ferromagnetic rings.

The first flux closure member 138 has a first plurality of fingers, indicated generally at 144. The second flux closure member 140 has a second plurality of fingers, indicated generally at 146. The third flux closure member 142 has a third plurality of fingers 148.

The first fingers 144 extend axially in a single direction from the first flux closure member 138 towards the second flux closure member 140. The second fingers 146 axially extend from the second flux closure member 140 in opposing directions towards the first and third flux closure members 138 and 142, respectively. The second fingers 146 have first portions 146A extending towards the first flux closure member 138 and second portions 146B extending towards the third flux closure member 142. As illustrated, the first and second portions 146A and 146B, respectively, are aligned across the second flux closure member 140 such that the second fingers 146 continue across the second flux closure member 140 between the first portions 146A and the second portions 146B. The third fingers 148 extend axially in a single direction from the third flux closure member 142 towards the second flux closure member 140.

As best shown in FIGS. 3 and 4, the first, second, and third flux closure members 138, 140, and 142, respectively, are positioned relative to each other such that the first fingers 144 intermesh with the first portions 146A of the second fingers 146 and the second portions 146B of the second fingers 146 intermesh with the third fingers 148 when the torque sensor assembly 114 is assembled.

Preferably, a first quantity of the first fingers 144 is equal to a second quantity of the second fingers 146 (with quantities of the first and second portions 146A and 146B, respectively, being equal), a third quantity of the third fingers 148, and a fourth quantity of the magnets 136. As illustrated, each of the second fingers extends towards both the first flux closure member 138 and the third flux closure member 142. In the illustrated embodiment, the first, second, third, and fourth quantities each being eight is a non-limiting example. Alternatively, the first, second, third, and fourth quantities may be more than or less than eight.

Each of the magnets 136 has a first pole, generally indicated at 136A, and a second pole, generally indicated at 136B. The magnets 136 are positioned such that a line L between the first pole 136A and the second pole 136B is transverse to the torque assembly axis X3. The magnets 136 are arranged such that the first pole 136A of a first magnet is adjacent a second pole 136B' of a second magnet and the second pole 136B of the first magnet is adjacent a first pole 136A' of a third magnet—i.e., the magnets 136 have alternating poles in a circumferential direction that is transverse to the torque assembly axis X3.

In the illustrated embodiment, the magnets 136 are illustrated immediately adjacent each other without any air gaps or other clearances. Alternatively, the magnets 136 may be arranged such that there are air gaps and/or space between each of the magnets 136. Each of the magnets 136 emits a magnetic field that is configured to be collected by the first, second, and third flux closure members 138, 140, and 142, respectively.

The torque sensor assembly 114 further comprises first, second, and third flux closure extensions, indicated generally at 150, 152, and 154, respectively. The first flux closure extension 150 has an arcuate first portion 150A and a second portion 150B. The first portion 150A is in relationship with the first flux closure member 138—i.e., the first portion 150A may be fixed, otherwise connected to, or positioned sufficiently close to the first flux closure member 138 such that the magnetic fields collected by the first flux closure member 138 are carried from the first flux closure member 138 to the second portion 150B.

Similarly, the second flux closure extension 152 has an arcuate first portion 152A and a second portion 152B and the third flux closure extension 154 has an arcuate first portion 154A and a second portion 152B. The first portion 152A of the second flux closure extension 152 carries the magnetic fields collected by the second flux closure member 140 from the second flux closure member 140 to the second portion 152B. The first portion 154A of the third flux closure extension 154 carries the magnetic fields collected by the third flux closure member 142 from the third flux closure member 142 to the second portion 154B.

Alternatively, one or more of the first, second, or third flux closure extensions 150, 152, or 154, respectively, may be formed integrally with the respective first, second, or third flux closure member 138, 140, or 142, respectively, such that the flux closure extension and flux closure member are a single component.

Alternatively, one or more of the first, second, and third flux closure extensions, indicated generally at 150, 152, and 154, respectively, may be omitted. When the first flux closure extension 150 is omitted, then the first flux closure member 138 channels the magnetic field to and from the magnets 136 directly to and from the first sensor 160. When the second flux closure extension 152 is omitted, then the second flux closure member 140 channels the magnetic field from the magnets 136 directly to and from the first and second sensors 160 and 162, respectively. When the third flux closure extension 154 is omitted, then the third flux closure member 142 channels the magnetic field from the magnets 136 directly to and from the second sensor 162.

As best shown in FIGS. 3 and 4, there is a first air gap or clearance, indicated generally at 156, between the second portion 150B of the first flux closure extension 150 and the second portion 152B of the second flux closure extension 152. There is also a second air gap or clearance, indicated generally at 158, between the second portion 152B of the second flux closure extension 152 and the second portion 154B of the third flux closure extension 154.

First and second magnetic sensors 160 and 162, respectively, are fixed or otherwise supported on the housing 102. Alternatively, the first and second sensors 160 and 162, respectively, may be fixed on a subhousing for the torque sensor assembly 114 within the housing 102. For example, the first and second sensors 160 and 162, respectively, may be soldered to a printed circuit board that is captured by the subhousing. The first sensor 160 is positioned in the first air gap 156 and the second sensor 162 is positioned in the second air gap 158. As non-limiting examples, the first and second sensors 160 and 162, respectively, may be Hall effect sensors, giant magnetoresistance sensors, anisotropic magnetoresistance sensors, or fluxgate magnetometers. Alternatively, the first and second sensors 160 and 162, respectively, may be any suitable sensor that generates or otherwise outputs a predictable electrical signal in response to a variation in a magnetic field.

The magnets 136 are fixed to either the input shaft 108 (with the first and second sensors 160 and 162, respectively, on the lower shaft 112) or the lower shaft 112 (with the first and second sensors 160 and 162, respectively, on the input shaft 108). Typically, the magnets 136 are fixed to a support ring or other structure (not shown) that is in turn fixed to the input shaft 108 or the lower shaft 112.

When the magnets 136 are positioned relative to the first, second, and third flux closure members 138, 140, and 142, respectively, as shown in FIG. 3, then the first, second, and third fingers 144, 146, and 148, respectively, are centered with the first and second poles 136A and 136B, respectively, of the magnets 136, and the first, second, and third fingers 144, 146, and 148, respectively, collect the magnetic fields at a maximum strength. As illustrated by arrows 164 in FIG. 3, the magnetic fields flow from the first pole 136A of each of the magnets 136, through both the first fingers 144 to the first flux closure member 138 and the third fingers 148 to the third flux closure member 142. The first flux closure extension 150 then carries the magnetic fields to the first air gap 156 and the third flux closure extension 154 carries the magnetic fields to the second air gap 158.

The magnetic fields then flow across the first air gap 156 from the first flux closure extension 150 to the second flux closure extension 152. In doing so, the magnetic fields flow across the first sensor 160 and the first sensor 160 generates and outputs a first electrical signal in response to the magnetic fields. Similarly, the magnetic fields flow across the second air gap 158 from the third flux closure extension 154 to the second flux closure extension 152 across the second sensor 162 and the second sensor 162 generates and outputs a second electrical signal in response to the magnetic fields. The magnetic fields then flow from the second flux closure extension 152 to the second pole 136B of each of the magnets 136 through the second flux closure member 140 and second fingers 146.

When the magnets 136 are positioned relative to the first, second, and third flux closure members 138, 140, and 142, respectively, as shown in FIG. 4, then the first, second, and third fingers 144, 146, and 148, respectively, are equidistant between the first and second poles 136A and 136B, respectively, of the magnets 136 and the first, second, and third fingers 144, 146, and 148, respectively, collect the magnetic fields at a minimum strength—i.e., a near zero strength. Otherwise, the reduced magnetic fields of the magnets 136 flow across the first and second sensors 160 and 162, respectively, as described above for FIG. 3.

This predictable and repetitive variation in magnetic field strengths (between the positions shown in FIGS. 3 and 4) as the magnets 136 rotate allows the signals generated by the first and second sensors 160 and 162, respectively, to be used to calculate the direction and magnitude of steering torque applied to the steering wheel 106. Alternatively, the first, second, and third flux closure members 138, 140, and 142, respectively, may rotate about the magnets 136.

Figure 5:
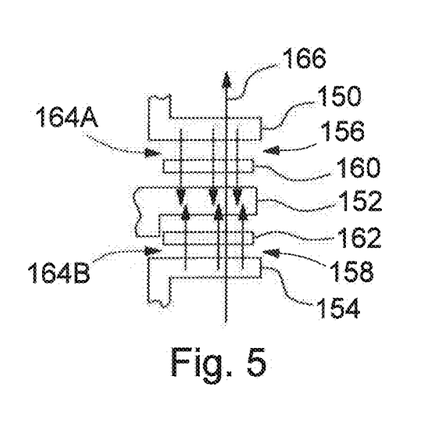
FIG. 5 is an enlarged portion of FIG. 3.

Referring now to FIG. 5, there is illustrated in detail the first sensor 160 measuring the magnetic fields, indicated generally by first arrows 164A, from the magnets 136 as the magnetic fields flow from the first flux closure extension 150 to the second flux closure extension 152. Similarly, the second sensor 162 measures the magnetic fields, indicated generally by second arrows 164B, from the magnets 136 as the magnetic fields flow from third flux closure extension 154 to the second flux closure extension 152.

The first and second sensors 160 and 162, respectively, also measure an external magnetic field 166. The external magnetic field 166 is from a magnetic source or sources external to the torque sensor assembly 114—i.e., not from the magnets 136. The external magnetic field 166 may be any magnetic field not emitted by any of the magnets 136 and may be from multiple sources.

The first and second sensors 160 and 162, respectively, are positioned to have like polarity. As a non-limiting example, a positive pole of the first sensor 160 may be positioned to be closest to the first flux closure extension 150 and a positive pole of the second sensor 162 may be positioned closest to the second flux closure extension 152.

A first strength of the magnetic fields flowing from the first flux closure extension 150 to the second flux closure extension 152 (illustrated by the first arrows 164A) may be characterized as $B_1$, a second strength of the magnetic fields flowing from the third flux closure extension 154 to the second flux closure extension 152 (illustrated by the second arrows 164B) may be characterized as $B_2$, and a third strength of the external magnetic field 166 may be characterized as $B_e$.

A first signal $S_1$ generated by the first sensor 160 as a result of the first and third strengths $B_1$ and $B_e$, respectively, may be described as:

$$S_1 = -B_1 + B_e \qquad (1)$$

and a second signal $S_2$ generated by the second sensor 162 as a result of the second and third strengths $B_2$ and $B_e$, respectively, may be described as:

$$S_2 = B_2 + B_e \quad (2).$$

EQN. 2 is subtracted from EQN. 1 to cancel or remove the external magnetic field term $B_e$ that is measured by both the first and second sensors 160 and 162, respectively:

$$S_1 - S_2 = (-B_1 + B_e) - (B_2 + B_e) \quad (3).$$

EQN. 3 may be simplified to:

$$S_1 - S_2 = B_1 + B_2 \quad (4)$$

wherein $S_1 - S_2$ is a torque signal calculated by the ECU 118 for operation of the power source 130.

Figure 6:
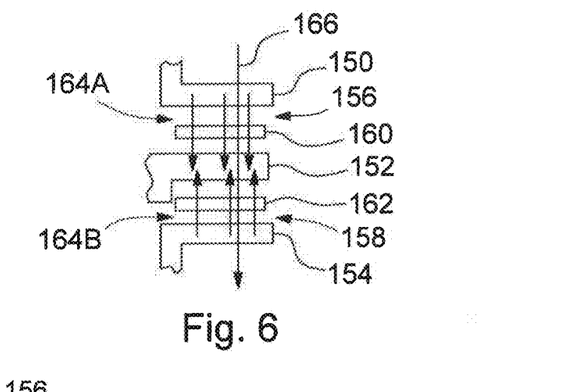
FIG. 6 is a partial elevation view of the torque sensor assembly of FIG. 1 with a different external magnetic field then in FIG. 5.

Referring now to FIG. 6, there is illustrated a portion of the torque sensor assembly 114 in which the external magnetic field 166 has opposite polarity from what is illustrated in FIG. 5 and the magnetic field from the magnets 136 is the same as illustrated in FIG. 5. The first signal $S_1$ generated by the first sensor 160 as a result of the first and third strengths $B_1$ and $B_e$, respectively, illustrated in FIG. 6 may be described as:

$$S_1 = -B_1 - B_e \quad (5)$$

and a second signal $S_2$ generated by the second sensor 162 as a result of the second and third strengths $B_2$ and $B_e$, respectively, illustrated in FIG. 6 may be described as:

$$S_2 = B_2 - B_e \quad (6).$$

EQN. 6 is subtracted from EQN. 5 to cancel or remove the external magnetic field term $B_e$ that is measured by both the first and second sensors 160 and 162, respectively:

$$S_1 - S_2 = (-B_1 - B_e) - (B_2 - B_e) \quad (7).$$

EQN. 7 may be simplified to:

$$S_1 - S_2 = B_1 + B_2 \quad (8)$$

wherein $S_1 - S_2$ is a torque signal calculated by the ECU 118 for operation of the power source 130.

Figure 7:
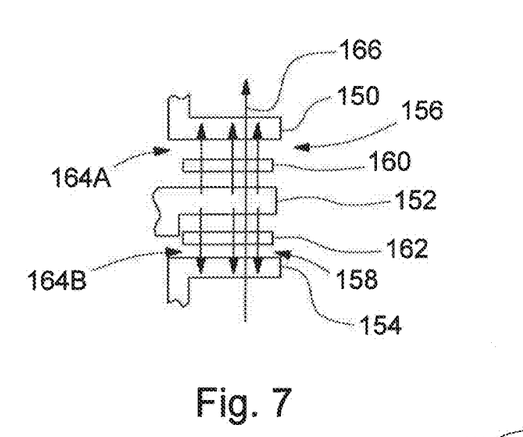
FIG. 7 is a partial elevation view of the torque sensor assembly of FIG. 1 in a different operational state from FIG. 5.

Referring now to FIG. 7, there is illustrated a portion of the torque sensor assembly 114 in a different operational state then what is illustrated in FIG. 5. In FIG. 7, the magnetic field from the magnets 136 has opposite polarity from what is illustrated in FIG. 5 and the external magnetic field 166 is the same as illustrated in FIG. 5. The first signal $S_1$ generated by the first sensor 160 as a result of the first and third strengths $B_1$ and $B_e$, respectively, as illustrated in FIG. 7 may be described as:

$$S_1 = B_1 + B_e \quad (9)$$

and a second signal $S_2$ generated by the second sensor 162 as a result of the second and third strengths $B_2$ and $B_e$, respectively, may as illustrated in FIG. 7 be described as:

$$S_2 = -B_2 + B_e \quad (10).$$

EQN. 10 is subtracted from EQN. 9 to cancel or remove the external magnetic field term $B_e$ that is measured by both the first and second sensors 160 and 162, respectively:

$$S_1 - S_2 = (B_1 + B_e) - (-B_2 + B_e) \quad (11).$$

EQN. 11 may be simplified to:

$$S_1 - S_2 = B_1 + B_2 \quad (12)$$

wherein $S_1 - S_2$ is a torque signal calculated by the ECU 118 for operation of the power source 130.

Figure 8:
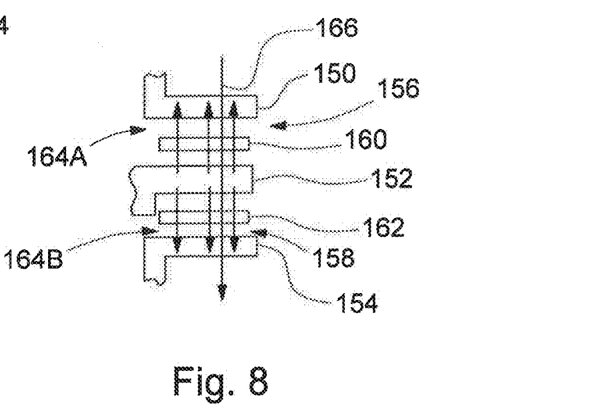
FIG. 8 is a partial elevation view of the torque sensor assembly of FIG. 1 in the operational state of FIG. 7 but with a different external magnetic field.

Referring now to FIG. 8, there is illustrated a portion of the torque sensor assembly 114 in the operational state of FIG. 7 but with a different external magnetic field. In FIG. 8, the magnetic field from the magnets 136 is opposite from what is illustrated in FIG. 5 and the external magnetic field 166 has opposite polarity from what is illustrated in FIG. 5. The first signal $S_1$ generated by the first sensor 160 as a result of the first and third strengths $B_1$ and $B_e$, respectively, as illustrated in FIG. 8 may be described as:

$$S_1 = B_1 - B_e \quad (13)$$

and a second signal $S_2$ generated by the second sensor 162 as a result of the second and third strengths $B_2$ and $B_e$, respectively, as illustrated in FIG. 8 may be described as:

$$S_2 = -B_2 - B_e) \quad (14).$$

EQN. 14 is subtracted from EQN. 13 to cancel or remove the external magnetic field term $B_e$ that is measured by both the first and second sensors 160 and 162, respectively:

$$S_1 - S_2 = (B_1 - B_e) - (-B_2 - B_e) \quad (15).$$

EQN. 15 may be simplified to:

$$S_1 - S_2 = B_1 + B_2 \quad (16)$$

wherein $S_1 - S_2$ is a torque signal calculated by the ECU 118 for operation of the power source 130.

Figure 10:
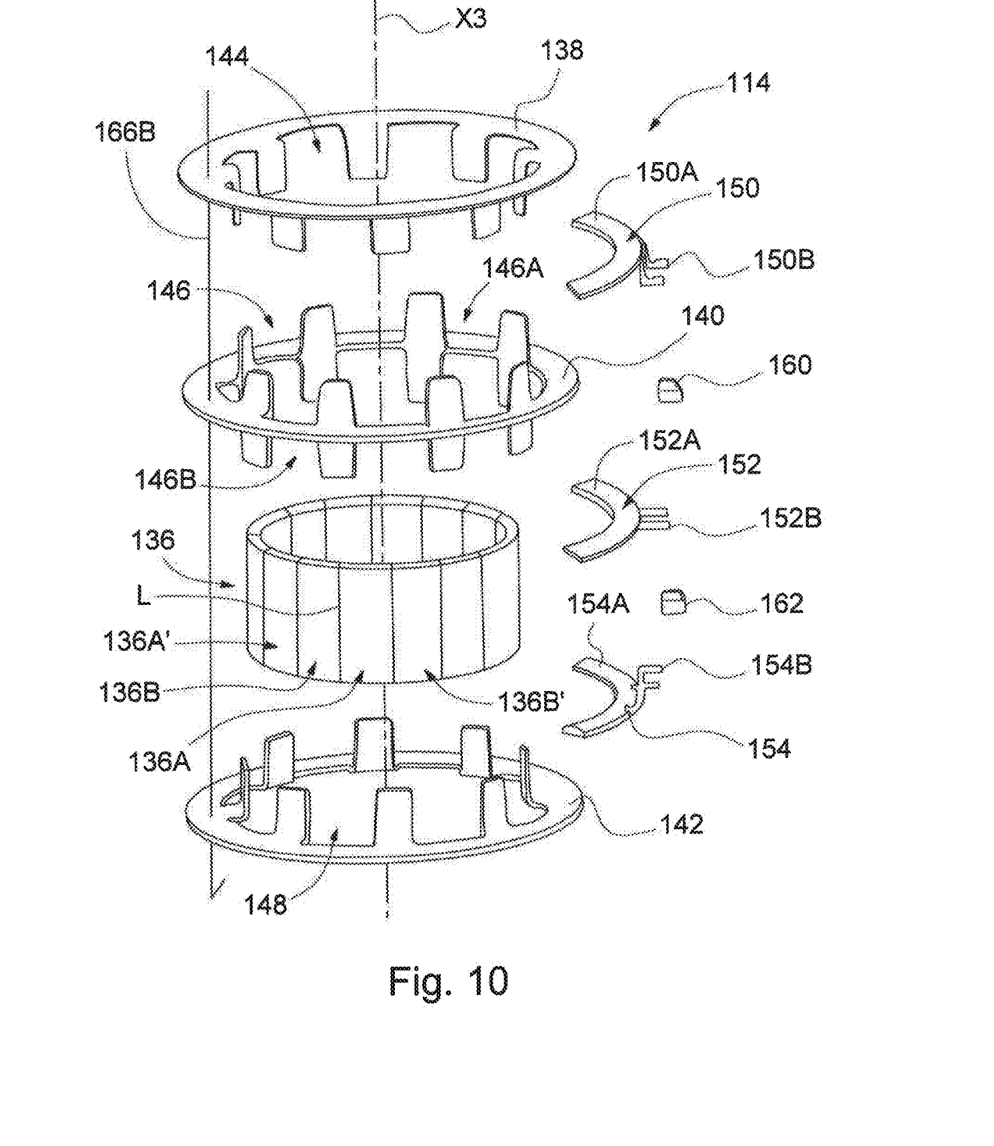
FIG. 10 is an exploded perspective view of the torque sensor assembly of FIG. 1 with a different external magnetic field then in FIGS. 5-9.
Figure 11:
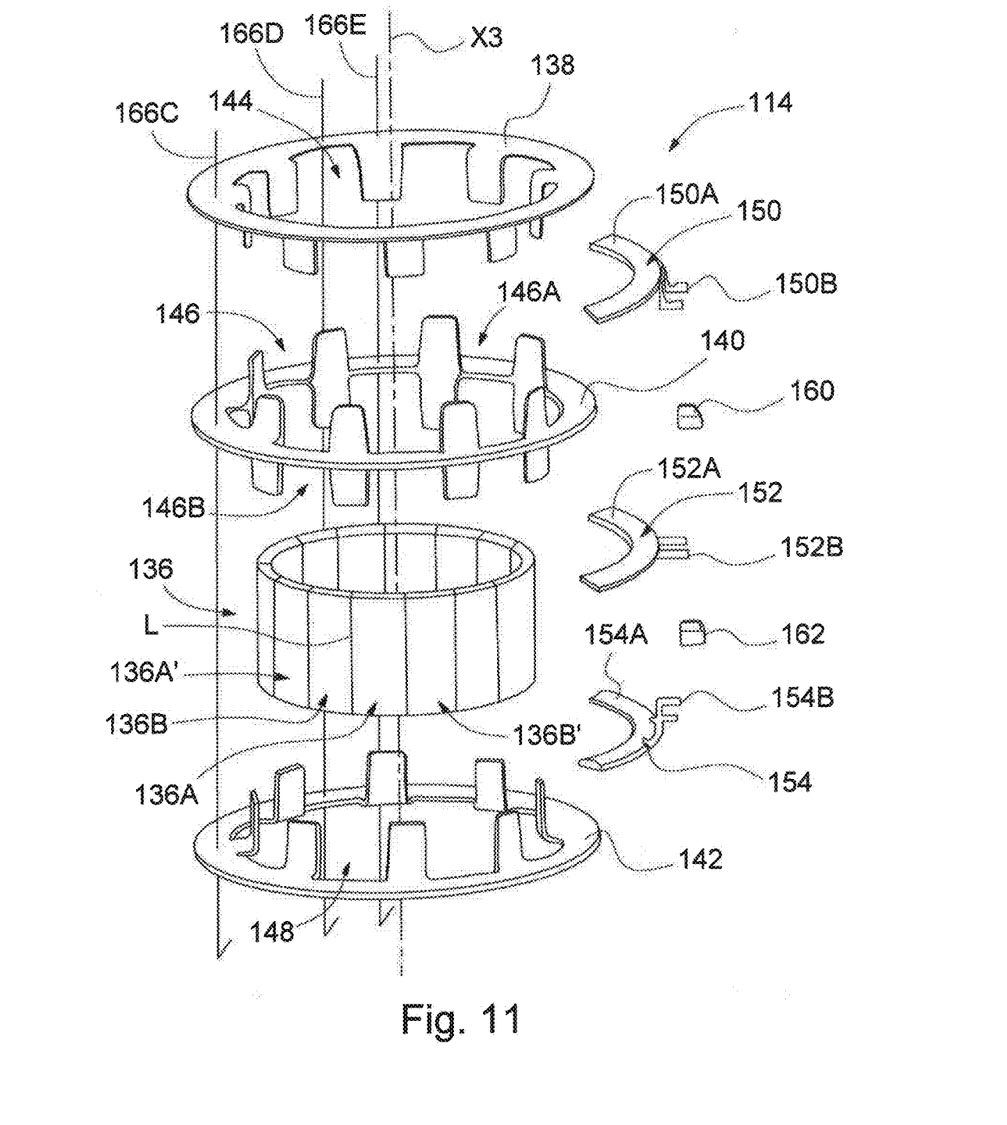
FIG. 11 is an exploded perspective view of the torque sensor assembly of FIG. 1 with a different external magnetic field then in FIGS. 5-10.

A shape, location, direction, and/or magnitude of the external magnetic field 166 is not limited to what is illustrated in FIGS. 5-8. Any external magnetic field that crosses the first, second, and third flux closure members 138, 140, and 142, respectively, or the first, second, and third flux closure extensions 150, 152, and 154, respectively, will be reduced or removed to at least some extent. For example, as non-limiting examples, the external magnetic field 166 may be as illustrated in FIGS. 9-11.

Figure 9:
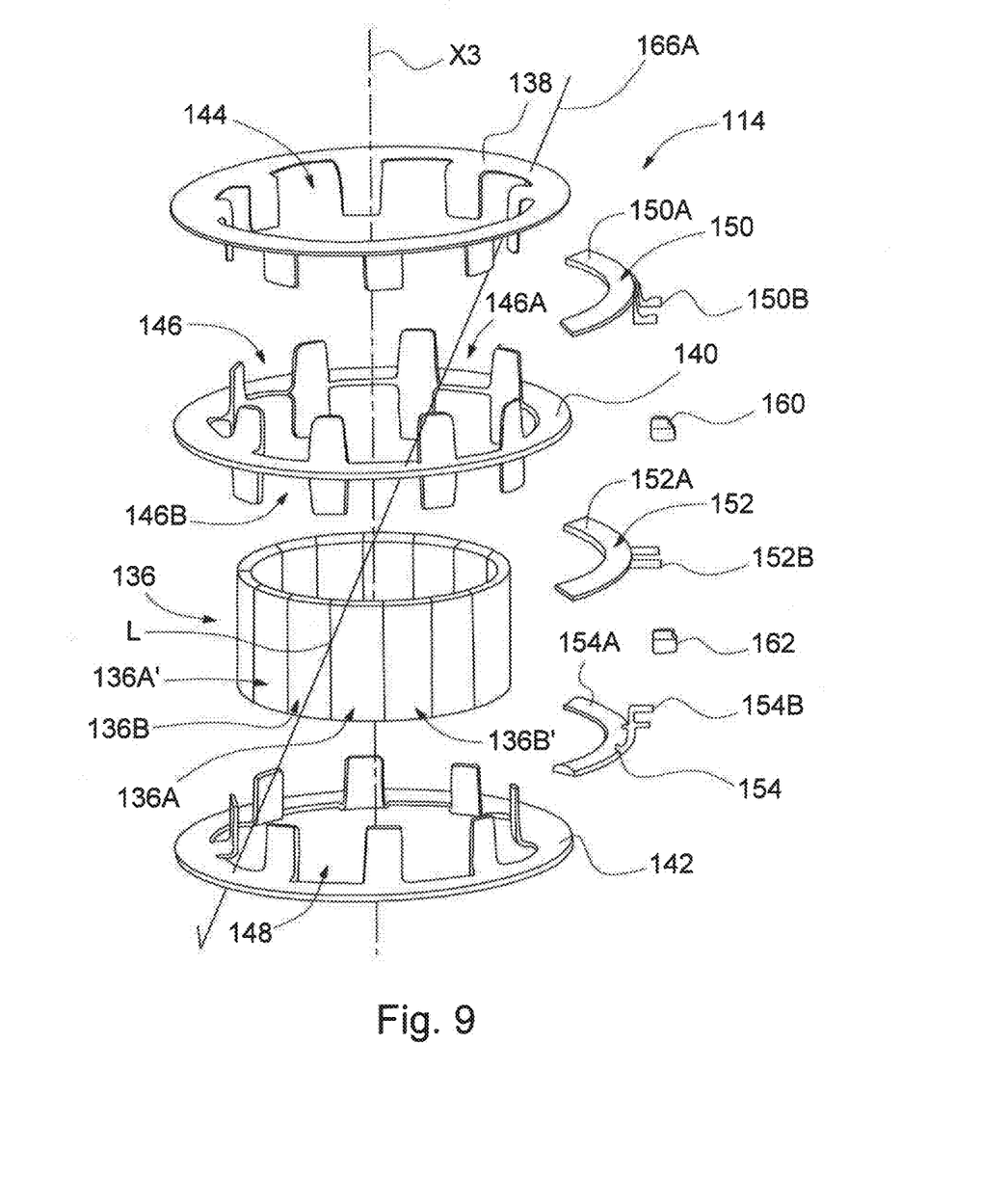
FIG. 9 is an exploded perspective view of the torque sensor assembly of FIG. 1 with a different external magnetic field then in FIGS. 5-8.

In FIG. 9, a vector 166A representing the external magnetic field passes through the first, second, and third flux closure members 138, 140, and 142, respectively, at different points in their circumferences. In FIG. 10, a vector 166B representing the external magnetic field passes through the first, second, and third flux closure members 138, 140, and 142, respectively, all at the same point in their circumferences. In FIG. 11, first, second, and third vectors 166C, 166D, and 166E, respectively, representing the external magnetic field pass through the first, second, and third flux closure members 138, 140, and 142, respectively, at approximately the same points in their circumferences, but as a cluster of three vectors. In FIGS. 9-11, the magnetic field emitted by the magnets 136 is not illustrated.

As discussed, the first and second sensors 160 and 162, respectively, are two channel sensors. Alternatively, the first and second sensors 160 and 162, respectively, may have greater than two channels. For example, the first and second sensors 160 and 162, respectively, may be three or four channel sensors.

Referring now to FIGS. 12-15, there is illustrated a second embodiment of a torque sensor assembly, indicated generally at 214, in accordance with this invention. Because the torque sensor assembly 214 is a variation of the torque sensor assembly 114, like reference numerals, incremented by 100, designate corresponding parts in the drawings and detailed description thereof will be omitted.

Figure 12:
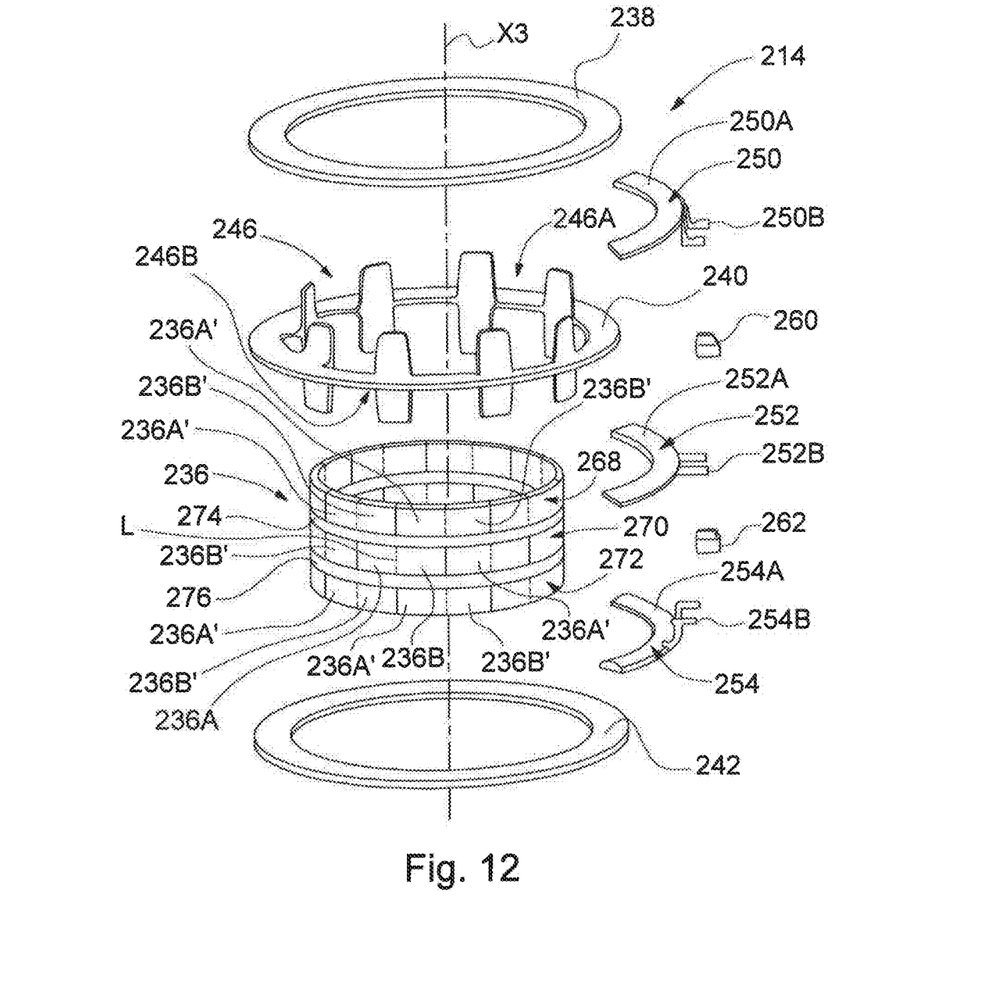
FIG. 12 is an exploded perspective view of a second embodiment of a torque sensor assembly in accordance with the present invention.
Figure 13:
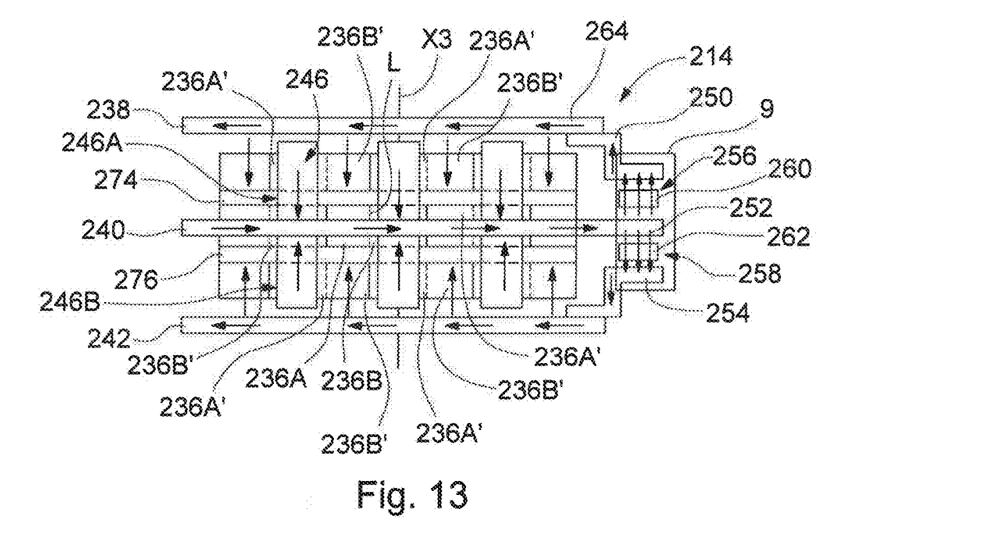
FIG. 13 is an elevation view of the torque sensor assembly of FIG. 12 in a first position.
Figure 14:
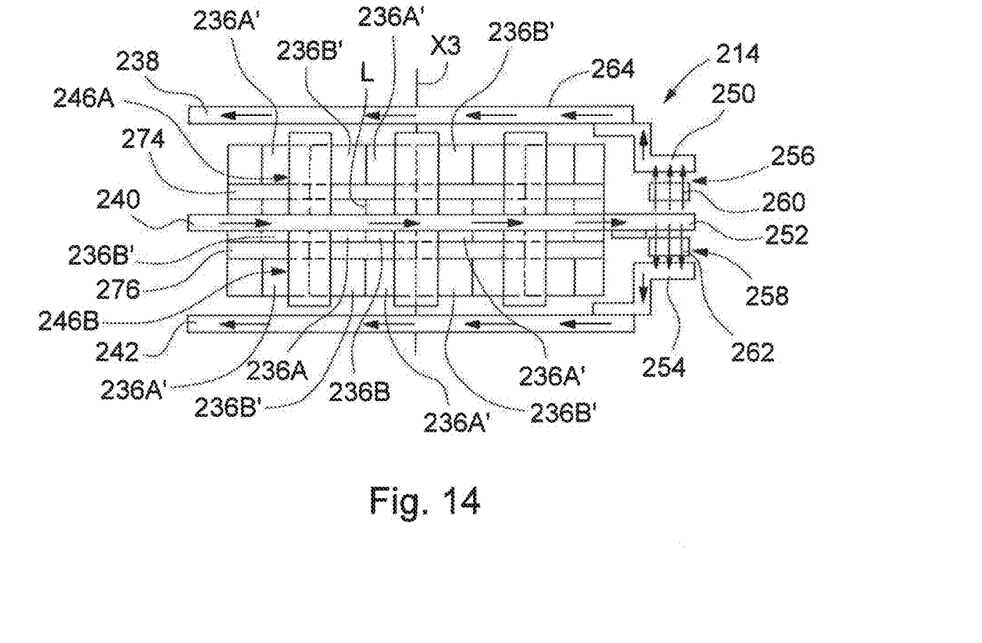
FIG. 14 is an elevation view of the torque sensor assembly of FIG. 12 in a second position.

Magnets 236 comprise circular first, second, and third magnet layers, indicated generally at 268, 270, and 272, respectively. Although the magnets 236 are illustrated as having three magnet layers, the magnets 236 may have more or fewer than three magnet layers. Between the first and second magnet layers 268 and 270, respectively, is a first support structure 274 and between the second and third magnet layers 270 and 272, respectively, is a second support structure 276. The first and second support structures 274 and 276, respectively, support the magnets 236.

The magnets 236 are arranged such that a first pole 236A of a first magnet is adjacent to second poles 236B' of adjacent magnets and a second pole 236B of the first magnet is adjacent first poles 236A' of the adjacent magnets so that a "checkerboard" pattern is formed. As such, the magnets 236 are arranged in the first, second, and third magnet layers 268, 270, and 272, respectively, such that first and second poles of the magnets alternate along an axial direction parallel to an torque assembly axis X3 and along a circumferential direction that is transverse to the torque assembly axis X3. Furthermore, the magnets 236 are arranged such that similar poles align diagonally.

Although first and third flux closure members 238 and 242, respectively, are illustrated without fingers, fingers such as the first and third fingers 144 and 148, respectively, may be provided for the first and third flux closure members 238 and 242, respectively.

When the magnets 236 are positioned relative to first, second, and third flux closure members 238, 240, and 242, respectively, as shown in FIG. 7, then fingers 246 are centered with the first and second poles 236A and 236B, respectively, of the magnets 236, and the first, second, and third flux closure members 238, 240, and 242, respectively, collect the magnetic fields at a maximum strength (the second flux closure member 240 collects the magnetic fields via the fingers 246).

When the magnets 236 are positioned relative to the first, second, and third flux closure members 238, 240, and 242, respectively, as shown in FIG. 8, then the fingers 246 are equidistant between the first and second poles 236A and 236B, respectively, of the magnets 236 and the first, second, and third flux closure members 238, 240, and 242, respectively, collect the magnetic fields at a minimum strength—i.e., a near zero strength (the second flux closure member 240 again collecting the magnetic fields via the fingers 246).

Figure 15:
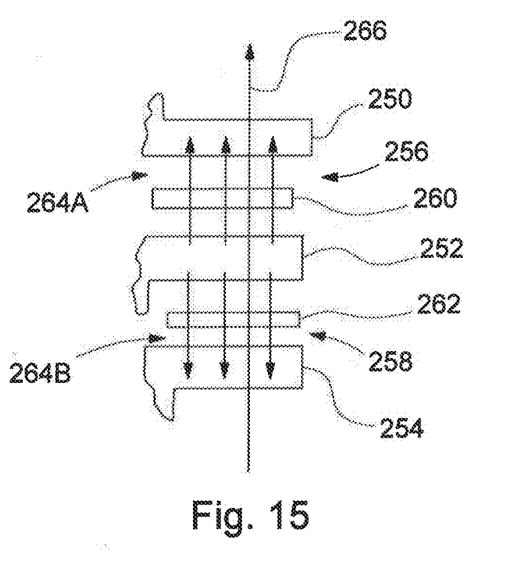
FIG. 15 is an enlarged portion of FIG. 13.

A first strength of magnetic fields flowing from the first flux closure extension 250 to the second flux closure extension 252 (illustrated by arrows 264A) may be characterized as $B_1$, a second strength of magnetic fields flowing from the third flux closure extension 254 to the second flux closure extension 252 (illustrated by arrows 264B) may be characterized as $B_2$, and a third strength of an external magnetic field 266 may be characterized as $B_e$.

A first signal $S_1$ generated by the first sensor 260 as a result of the first and third strengths $B_1$ and $B_e$, respectively, may be described as:

$$S_1 = B + B_e \quad (17)$$

and a second signal $S_2$ generated by the second sensor 262 as a result of the second and third strengths $B_2$ and $B_e$, respectively, may be described as:

$$S_2 = -B_2 + B_e \quad (18)$$

EQN. 18 is subtracted from EQN. 17 to remove the external magnetic field term $B_e$ that is measured by both the first and second sensors 260 and 262, respectively:

$$S_1 - S_2 = (B_1 + B_e) - (-B_2 + B_e) \quad (19)$$

EQN. 19 may be simplified to:

$$S_1 - S_2 = B_1 + B_2 \quad (20)$$

wherein $S_1 - S_2$ is a torque signal for operation of a power source for the power steering system.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A torque sensor assembly adapted for use in a vehicle power steering system having components comprising:
    a plurality of magnets each emitting a magnetic field;
    coaxial first, second, and third flux closure members around the magnets, wherein the second flux closure member is between the first and third flux closure members, the first and third flux closure members collect the magnetic fields having a first polarity, and the second flux closure member collects the magnetic fields having a second polarity that is opposite the first polarity;
    first and second magnetic sensors positioned to have like polarity, wherein the first sensor is between the first and second flux closure members and the second sensor is between the second and third flux closure members; and
    further comprising at least one flux closure extension between the first flux closure member and the first sensor, the second flux closure member and the first and second sensors, or the third flux closure member and the second sensor;
    wherein the above configuration of the components reduces a susceptibility of the torque sensor assembly to external magnetic fields without the use of shielding.

2. The torque sensor assembly of claim 1 further comprising:
    a first signal output by the first sensor in response to the magnetic fields; and
    a second signal output by the second sensor in response to the magnetic fields.

3. The torque sensor assembly of claim 2 further comprising:
    a torque signal calculated by subtracting the second signal from the first signal.

4. The torque sensor assembly of claim 1 wherein the first, second, and third flux closure members are ferromagnetic rings.

5. The torque sensor assembly of claim 1 further comprising:
    first fingers extending from the first flux closure member;
    second fingers extending from the second flux closure member; and
    third fingers extending from the third flux closure member, wherein the first and third fingers align with first poles of the magnets when the second fingers align with second poles of the magnets, the first poles have the first polarity, and the second poles have the second polarity.

6. The torque sensor assembly of claim 5 wherein a first quantity of the first fingers is equal to a second quantity of the second fingers, a third quantity of the third fingers, and a fourth quantity of the magnets.

7. The torque sensor assembly of claim 1 wherein the at least one flux closure extension is formed integrally with the respective first, second, or third flux closure members.

8. The torque sensor assembly of claim 1 wherein the first and second sensors are Hall effect sensors.

9. The torque sensor assembly of claim 1 wherein the magnets are arranged with alternating poles in a circumferential direction.

10. A torque sensor assembly adapted for use in a vehicle power steering system having components comprising:

a plurality of magnets each emitting a magnetic field;

coaxial first, second, and third flux closure members around the magnets, wherein the second flux closure member is between the first and third flux closure members, the first and third flux closure members collect the magnetic fields having a first polarity, and the second flux closure member collects the magnetic fields having a second polarity that is opposite the first polarity; and first and second magnetic sensors positioned to have like polarity, wherein the first sensor is between the first and second flux closure members and the second sensor is between the second and third flux closure members, wherein the magnets comprise a plurality of magnet layers coaxial with the first, second, and third flux closure members and the magnets in the magnet layers are arranged with alternating poles in circumferential and axial directions;

wherein the above configuration of the components reduces a susceptibility of the torque sensor assembly to external magnetic fields without the use of shielding.

11. The torque sensor assembly of claim 10 wherein the plurality of magnet layers comprises first, second, and third magnet layers.

12. The torque sensor assembly of claim 1 further comprising:

a first shaft; and a second shaft, wherein the magnet is fixed to the first shaft and the first and second sensors are fixed to the second shaft.

13. A torque sensor assembly adapted for use in a vehicle power steering system having components comprising:

a plurality of circularly arranged magnets, wherein each of the magnets has a first pole and a second pole and the first and second poles alternate in a circumferential direction;

a first flux closure member having first fingers;

a second flux closure member having second fingers;

a third flux closure member having third fingers, wherein the first, second, and third flux closure members are ferromagnetic rings coaxial with the plurality of magnets, the second flux closure member is between the first and third flux closure members, the first and third fingers align with the first poles, and the second fingers align with the second poles;

a first magnetic sensor between the first and second flux closure members, wherein the first sensor generates a first signal in response to the plurality of magnets; and a second magnetic sensor between the second and third flux closure members, wherein the second sensor generates a second signal in response to the plurality of magnets, the second sensor is positioned to have like polarity with the first sensor, and the second signal subtracted from the first signal is a torque signal for the power steering system; and further comprising a first flux closure extension between the first flux closure member and the first sensor;

a second flux closure extension between the second flux closure member and the first and second sensors; and a third flux closure extension between the third flux closure member and the second sensor, wherein the first sensor is in a first gap between the first and second flux closure extensions and the second sensor is in a second gap between the second and third flux closure extensions;

wherein the above configuration of the components reduces a susceptibility of the torque sensor assembly to external magnetic fields without the use of shielding.

14. The torque sensor assembly of claim 13 wherein one or more of the first, second, or third flux closure extensions is formed integrally with the respective first, second, or third flux closure members.

15. The torque sensor assembly of claim 13 wherein a first quantity of the first fingers is equal to a second quantity of the second fingers, a third quantity of the third fingers, and a fourth quantity of the magnets.

16. A torque sensor assembly adapted for use in a vehicle power steering system having components comprising:

a plurality of circular magnet layers on an axis, wherein magnets in the magnet layers are arranged with alternating first and second poles in axial and circumferential directions and emit a magnetic field;

coaxial first, second, and third flux closure members around the magnets, wherein the first, second, and third flux closure members are ferromagnetic rings, the second flux closure member is between the first and third flux closure members, the first and third flux closure members collect the magnetic fields having a first polarity, and the second flux closure member collects the magnetic fields having a second polarity that is opposite the first polarity;

a first magnetic sensor, between the first and second flux closure members, that generates a first signal in response to the magnetic fields; and a second magnetic sensor, between the second and third flux closure members, that generates a second signal in response to the magnetic fields, wherein the second sensor is positioned to have like polarity with the first sensor and the second signal subtracted from the first signal is a torque signal for the power steering system; and further comprising a first flux closure extension between the first flux closure member and the first sensor;

a second flux closure extension between the second flux closure member and the first and second sensors; and a third flux closure extension between the third flux closure member and the second sensor, wherein the first sensor is between the first and second flux closure extensions and the second sensor is between the second and third flux closure extensions;

wherein the above configuration of the components reduces a susceptibility of the torque sensor assembly to external magnetic fields without the use of shielding.

17. The torque sensor assembly of claim 16 wherein the plurality of magnet layers comprises first, second, and third magnet layers.

18. The torque sensor assembly of claim 16 wherein the second flux closure member has fingers collecting the magnetic fields having the second polarity.

19. The torque sensor assembly of claim 16 wherein one or more of the first, second, or third flux closure extensions is formed integrally with the respective first, second, or third flux closure members.

\* \* \* \* \*